US008384588B2

(12) United States Patent
Hansen

(10) Patent No.: US 8,384,588 B2
(45) Date of Patent: Feb. 26, 2013

(54) BEAM STABILIZATION FOR WIDEBAND PHASE COMPARISON MONOPULSE ANGLE ESTIMATION WITH ELECTRONICALLY STEERED ANTENNAS

(75) Inventor: Charles T. Hansen, Palos Verdes Estates, CA (US)

(73) Assignee: Raytheon Company, Waltham, MA (US)

( * ) Notice: Subject to any disclaimer, the term of this patent is extended or adjusted under 35 U.S.C. 154(b) by 337 days.

(21) Appl. No.: 12/925,668

(22) Filed: Oct. 26, 2010

(65) Prior Publication Data

US 2012/0098694 A1     Apr. 26, 2012

(51) Int. Cl.
*G01S 13/44* (2006.01)
(52) U.S. Cl. ............... 342/154; 342/149; 342/196
(58) Field of Classification Search .......... 342/154
See application file for complete search history.

(56) References Cited

U.S. PATENT DOCUMENTS

| 2,608,683 | A |   | 8/1952  | Blewett |
| 2,981,948 | A |   | 4/1961  | Kurtz |
| 3,295,128 | A | * | 12/1966 | Canaday et al. ............. 342/129 |
| 3,713,155 | A |   | 1/1973  | Jaffe |
| 3,943,523 | A | * | 3/1976  | Fassett ........................ 342/368 |
| 4,675,678 | A | * | 6/1987  | Klingenschmitt et al. ...... 342/34 |
| 5,013,979 | A | * | 5/1991  | Birleson ...................... 342/375 |
| 5,223,850 | A |   | 6/1993  | Branigan et al. |
| 5,592,178 | A |   | 1/1997  | Chang et al. |
| 7,190,305 | B2 |  | 3/2007  | Isaji |

* cited by examiner

*Primary Examiner* — John B Sotomayor
*Assistant Examiner* — Matthew M Barker
(74) *Attorney, Agent, or Firm* — Christie, Parker & Hale, LLP

(57) ABSTRACT

A method for estimating a target angle of a wideband signal received on an electronically steered antenna array includes: generating spatial frequency data from the received wideband signal; stabilizing the spatial frequency data to a beam steering direction; compressing the stabilized spatial frequency data to a plurality of frequency range bins; calculating a monopulse discriminant from the stabilized spatial frequency data; and calculating the target angle using the monopulse discriminant.

19 Claims, 11 Drawing Sheets

(5 of 11 Drawing Sheet(s) Filed in Color)

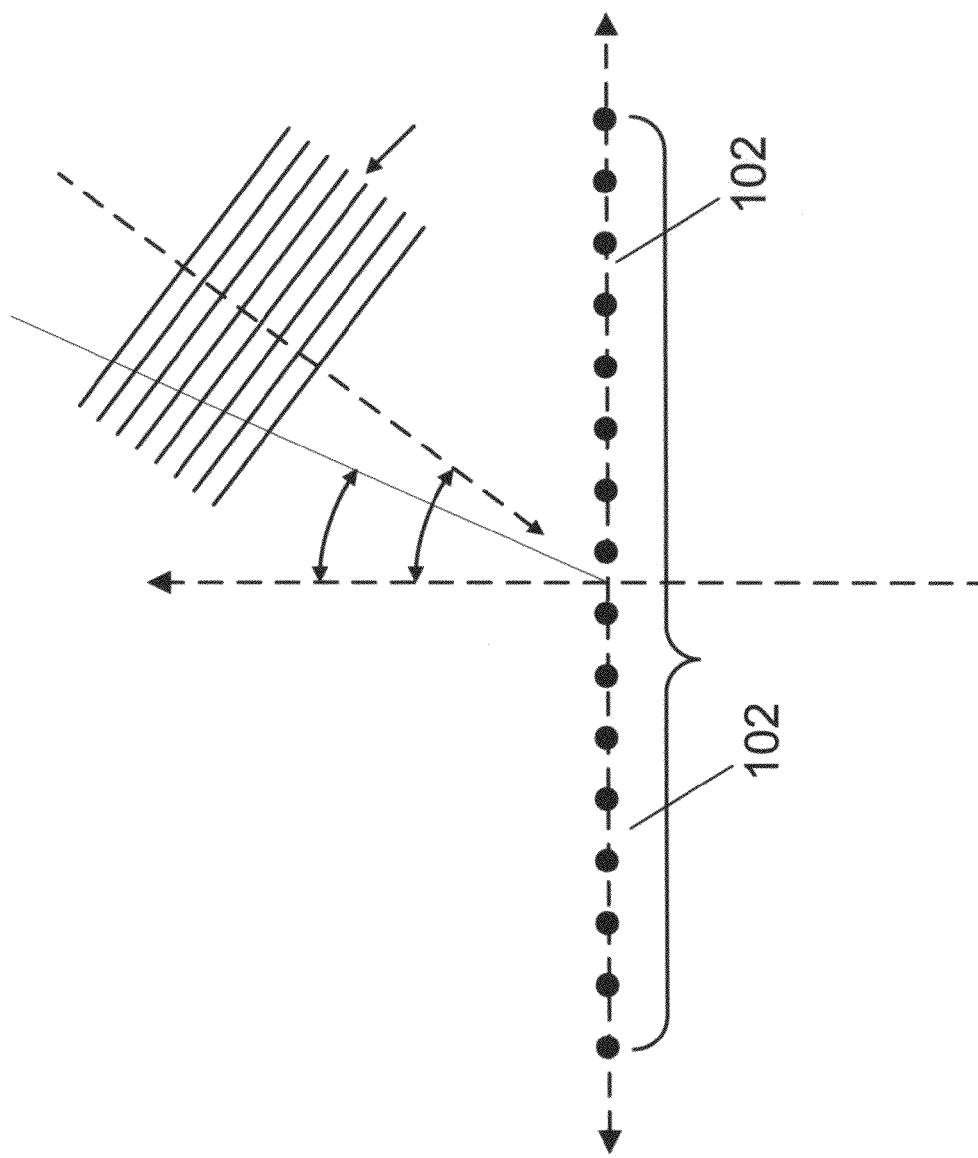

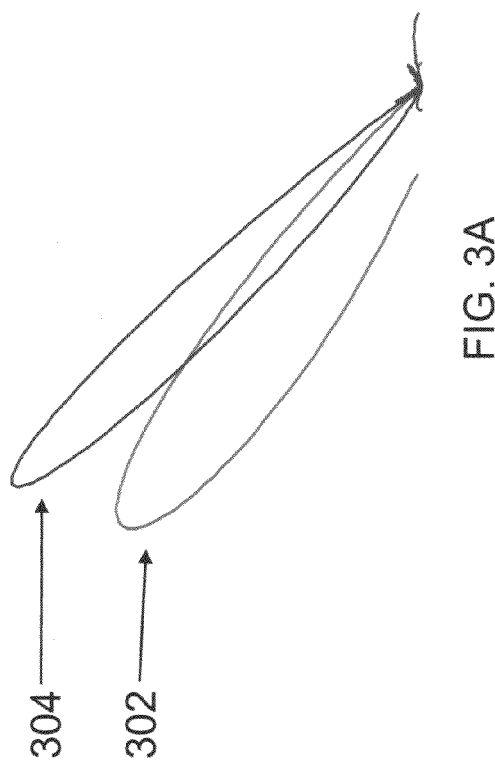
FIG. 3A
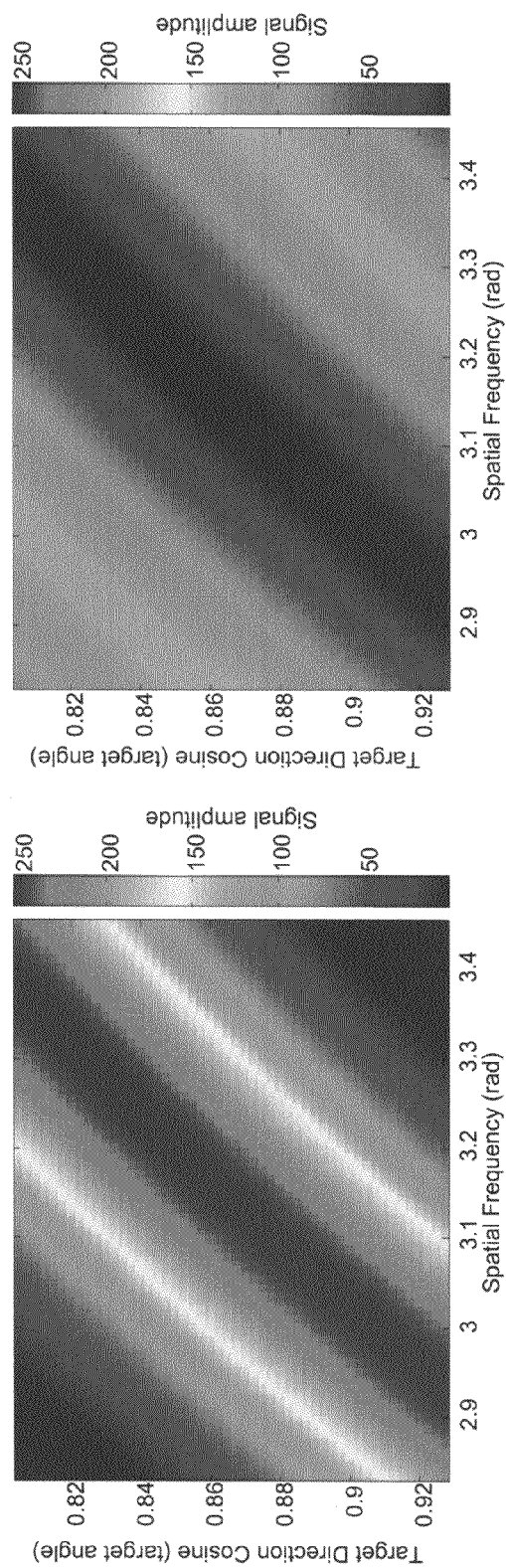
FIG. 3B
FIG. 3C

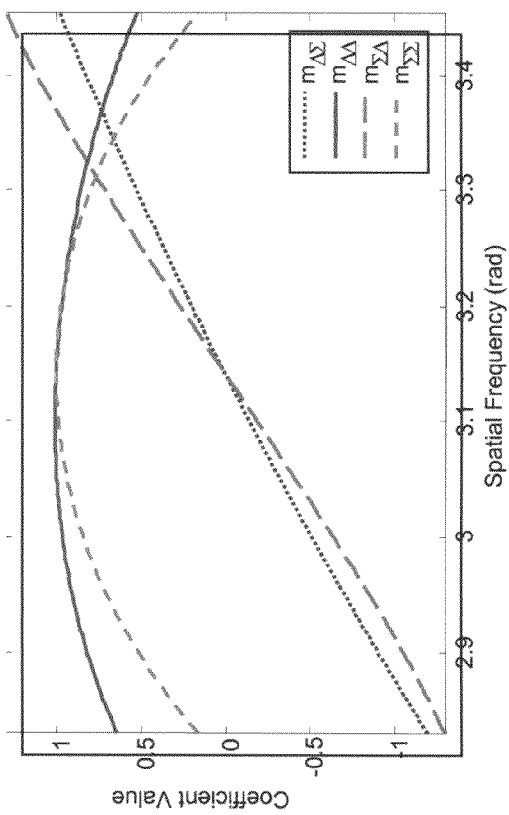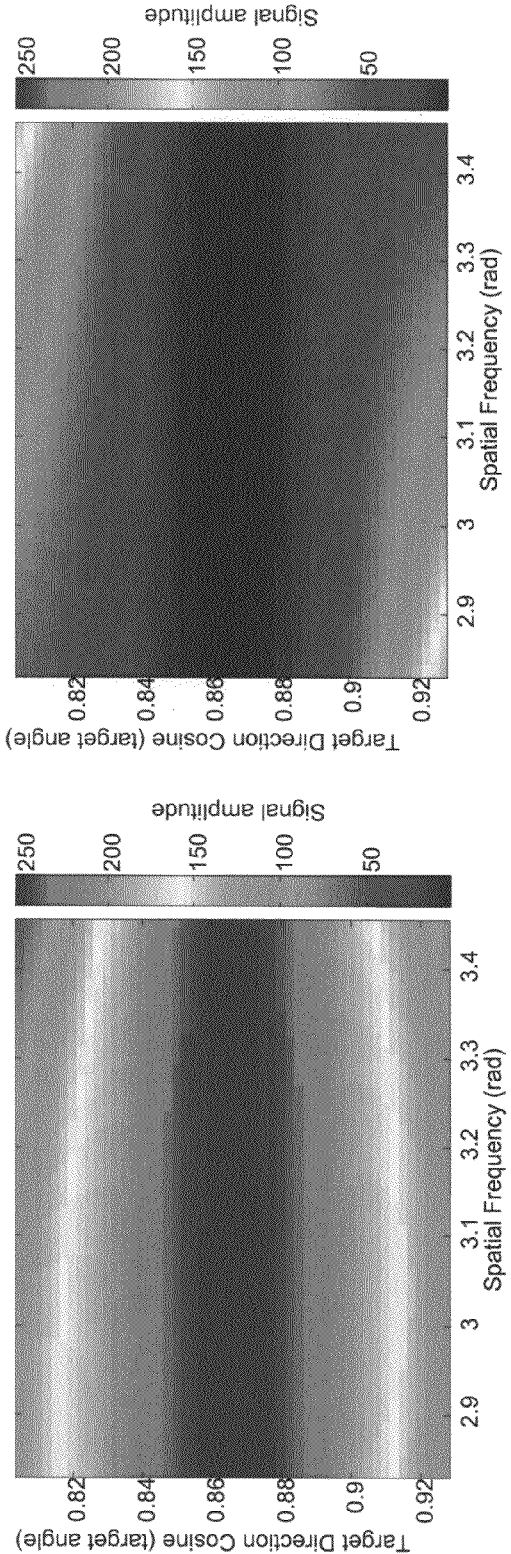
FIG. 7A
FIG. 7B
FIG. 7C

BEAM STABILIZATION FOR WIDEBAND PHASE COMPARISON MONOPULSE ANGLE ESTIMATION WITH ELECTRONICALLY STEERED ANTENNAS

STATEMENT REGARDING FEDERALLY SPONSORED RESEARCH OR DEVELOPMENT

This invention disclosure is related to Government contract F33615-02-D-1116 awarded by the Department of the Air Force. The Government has certain rights in this invention.

BACKGROUND

Phase comparison monopulse angle estimation is a well known technique for measuring angle of arrival of a signal in a radar or other radio frequency electromagnetic sensor. To use this technique, the receiving antenna is typically divided into two halves. The angle of arrival is a function of the ratio of the difference signal (created by subtracting the signal from the two halves) divided by the sum signal (created by adding the two halves). This value is known as the monopulse discriminant.

Generally, the algorithm that performs the angle estimation using the monopulse discriminant relies on the assumption that the value of the monopulse discriminant does not substantially vary as a function of the frequencies that make up the signal. However, this assumption does not hold true for wideband or spread spectrum waveforms or signals when they are measured by an electronically scanned phased array antenna.

SUMMARY

Embodiments of the present invention are directed to systems and methods for computing a monopulse discriminant that is substantially frequency invariant even for phase steered antennas when wideband waveforms are used. This frequency invariant monopulse discriminant can be used to compute the angle of arrival of wideband signals.

According to one embodiment of the present invention, a method for estimating a target angle of a wideband signal received on an electronically steered antenna array includes: generating spatial frequency data from the received wideband signal; stabilizing the spatial frequency data to a beam steering direction; compressing the stabilized spatial frequency data to a plurality of frequency range bins; calculating a monopulse discriminant from the stabilized spatial frequency data; and calculating the target angle using the monopulse discriminant.

According to another embodiment of the present invention, a system for stabilizing wideband spatial frequency data for estimating a target angle of a wideband signal on an electronically steered antenna array includes: a spatial frequency processor for transforming the wideband signal to spatial frequency data; a signal stabilizer configured to stabilize the spatial frequency data; a frequency to range transformer configured to compress the stabilized spatial frequency data into a plurality of frequency range bins; a monopulse discriminant calculator for calculating a monopulse discriminant from the compressed stabilized spatial frequency data; and a target angle calculator configured to calculate the target angle using the monopulse discriminant.

According to another embodiment of the present invention, a wideband monopulse radar system includes: an antenna array comprising a plurality of antennas for receiving a wideband monopulse signal; a signal processor for estimating a target angle of the wideband monopulse signal, the signal processor being configured to: transform the wideband monopulse signal to wideband spatial frequency data, stabilize spatial frequency data of the wideband monopulse signal to a beam steering direction; compress the stabilized spatial frequency data to a plurality of frequency range bins; calculate a monopulse discriminant from the compressed stabilized spatial frequency data; and calculate the target angle using the monopulse discriminant.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a diagram illustrating the arrival of a wideband signal on an antenna array according to one embodiment of the present invention.

FIG. 3A is a diagram illustrating a calculated target angle for a lowest frequency and a highest frequency of an unstabilized wideband signal according to a set of example conditions.

FIGS. 3B and 3C are graphs illustrating signal amplitude of an unstabilized wideband signal with respect to signal frequency and angle for a sum channel and a difference channel, respectively, according to a set of example conditions.

FIG. 7A is a graph showing the values of stabilization coefficients calculated according to one embodiment of the present invention for a set of example conditions.

FIGS. 7B and 7C are graphs illustrating signal amplitude of a stabilized wideband signal with respect to signal frequency and angle for a sum channel and a difference channel, respectively, according to one embodiment of the present invention for a set of example conditions.

DETAILED DESCRIPTION

Figure 1:
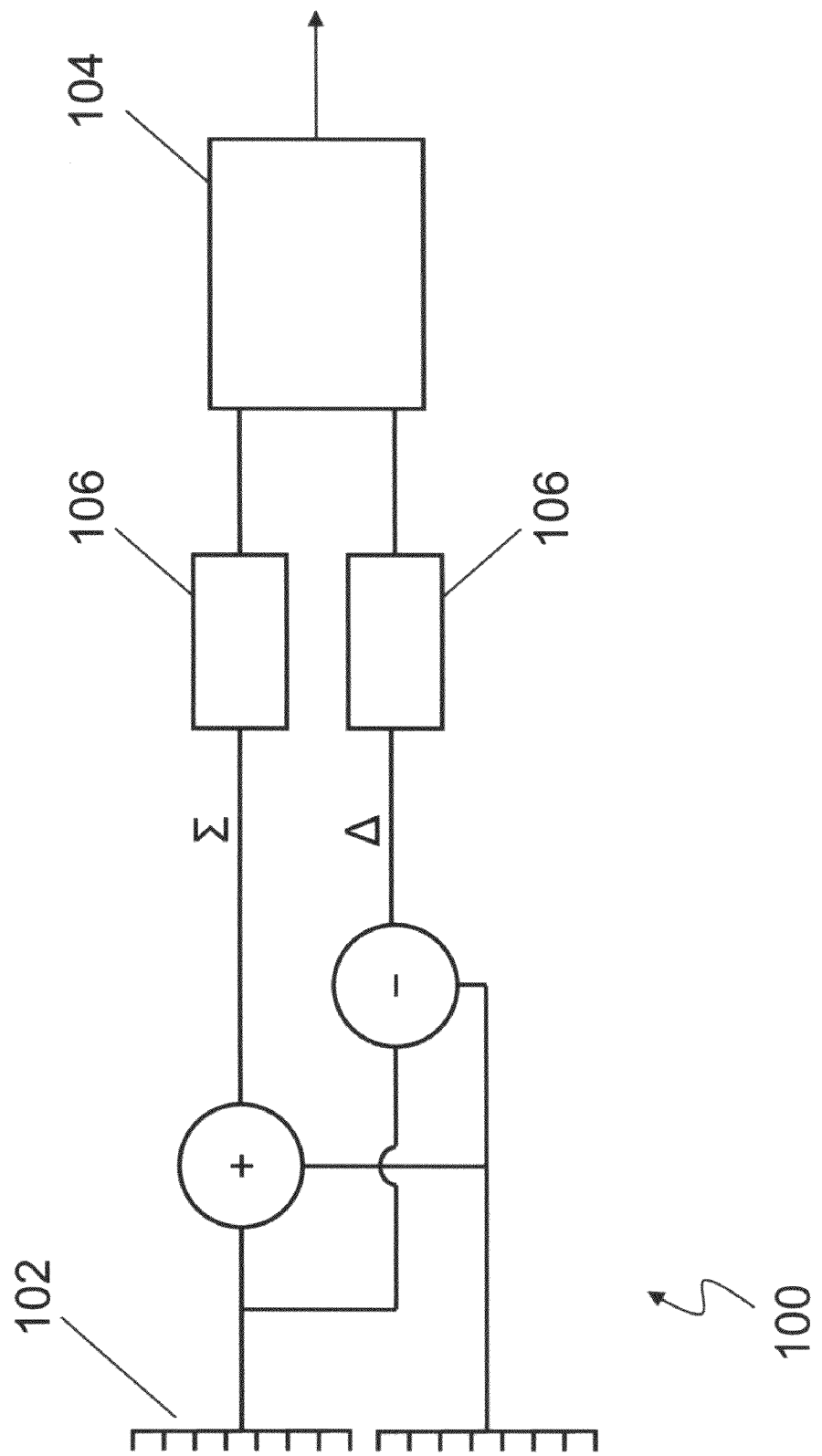
FIG. 1 is a block diagram of a radar system according to one embodiment of the present invention.

According to one embodiment of the present invention, phase comparison monopulse angle estimation may be used in a radar system 100 such as one shown in block diagram form in FIG. 1. An antenna 102 receives a signal which is split into sum and difference channels and supplied to analog-digital converters 106. A signal processor 104 may be used to analyze the received signals. The system 100 may also include filters, oscillators, and other analog and digital signal processing components as are well known in the art.

Angle estimation of radar returns is often done with an antenna having two channels: a sum channel and a difference channel. The angle of arrival of a received signal (or, equivalently, due to antenna reciprocity theorem, the transmission angle of an outgoing signal) is computed using the sum and difference channels, but the relationship between the angle of arrival and the relative amplitude of the received signal depends on the frequency of the signal when the antenna is steered using adjustment of phase between the elements. As a result, these angle estimation techniques are generally used with narrow band signals rather than wide band signals because there is not a well defined mapping between angle and relative amplitude of the signal for wide band signal. That is, the wide band signals have a range of frequencies, making it difficult to calculate a single angle of arrival for all of the frequencies. Therefore, a substantially frequency independent method of determining the angle of arrival would be useful.

To illustrate the problem, consider a simplified antenna model in which the antenna consists only of two omnidirectional elements spaced along a length L in the x direction. Suppose that a sinusoidal signal s having a frequency $\omega$ is incident on the antenna with angle of incidence $\theta$. The signals ($s_0$ and $s_1$) on the two halves of the antenna will be:

$$s_0 = \exp\left[-i\omega\left(t + \frac{L}{2c}\sin\theta\right)\right]$$
$$s_1 = \exp\left[-i\omega\left(t - \frac{L}{2c}\sin\theta\right)\right]$$

Therefore, the sum ($s_\Sigma$) of the two signals is:

$$s_\Sigma = \exp[-i\omega t]\left(\exp\left[-i\frac{\omega L}{2c}\sin\theta\right] + \exp\left[i\frac{\omega L}{2c}\sin\theta\right]\right)$$
$$s_\Sigma = \exp[-i\omega t]\left(2\cos\left[\frac{\omega L}{2c}\sin\theta\right]\right)$$

Similarly, the difference ($s_\Delta$) of the two signals is:

$$s_\Delta = \exp[-i\omega t]\left(2i\sin\left[\frac{\omega L}{2c}\sin\theta\right]\right)$$

Therefore, the monopulse discriminant ($s_\Delta/s_\Sigma$) is:

$$\frac{s_\Delta}{s_\Sigma} = i\tan\left[\frac{\omega L}{2c}\sin\theta\right]$$

Note that this expression can be used to determine the angle of arrival $\theta$ from the monopulse discriminant ($s_\Delta/s_\Sigma$) as long as $$\left|\frac{\omega L}{2c}\sin\theta\right| < \frac{\pi}{2}.$$

Note also that the relationship depends on the frequency of the signal ($\omega$). If this condition is not satisfied, then the relationship between the monopulse discriminant and angle of arrival admits multiple solutions, which means that the angle of arrival may be ambiguous.

Electronic steering can be used to determine the angle of arrival for signals that do not satisfy the condition $$\left|\frac{\omega L}{2c}\sin\theta\right| < \frac{\pi}{2}.$$

This is done by applying a phase (e.g., $$\left(e.g., +i\frac{\theta_s}{2} \text{ and } -\frac{\theta_s}{2}\right)$$

to each element. That is:

$$s_0 = \exp\left[-i\omega\left(t + \frac{L}{2c}\sin\theta\right) + i\frac{\theta_s}{2}\right]$$
$$s_1 = \exp\left[-i\omega\left(t - \frac{L}{2c}\sin\theta\right) - i\frac{\theta_s}{2}\right]$$

When these channels are combined, they form a monopulse discriminant that looks like:

$$\frac{s_\Delta}{s_\Sigma} = i\tan\left[\frac{\omega L}{2c}\sin\theta - \frac{\theta_s}{2}\right]$$

Similarly, the electronically steered array can be used to determine the angle of arrival for signals satisfying the condition $$\left|\frac{\omega L}{2c}\sin\theta - \frac{\theta_s}{2}\right| < \frac{\pi}{2}$$

and therefore $\theta$ satisfies the condition:

$$\left|\frac{\omega L}{2c}\sin\theta - \frac{\theta_s}{2}\right| < \frac{\pi}{2}$$
$$-\frac{\pi}{2} < \frac{\omega L}{2c}\sin\theta - \frac{\theta_s}{2} < \frac{\pi}{2}$$
$$\frac{\theta_s}{2} - \frac{\pi}{2} < \frac{\omega L}{2c}\sin\theta < \frac{\theta_s}{2} + \frac{\pi}{2}$$
$$\frac{c}{\omega L}(\theta_s - \pi) < \sin\theta < \frac{c}{\omega L}(\theta_s + \pi)$$
$$\arcsin\left[\frac{c}{\omega L}(\theta_s - \pi)\right] < \theta < \arcsin\left[\frac{c}{\omega L}(\theta_s + \pi)\right]$$

Therefore, the angle of arrival is centered on:

$$\theta_{look} = \arcsin\left[\frac{\theta_s c}{\omega L}\right]$$

In other words, the nominal look direction of the array (also referred to as a "steering angle" or "steering direction") is equal to $\theta_{look}$, which depends on the frequency $\omega$. Using the above described method to determine the angle of arrival is simple for single frequency or narrow band signals because there is little or no variation in frequency $\omega$ such that there is little or no variation in the computed direction $\theta_{look}$.

However, using the above described method to compute the angle of arrival of a wide band signal can be difficult because the above-developed monopulse discriminant is frequency dependent and a wide band signal includes a wide range of frequencies.

Assume, for example, a wide band signal incident on an antenna array that is steered to 60 degrees away from boresight. Assume there are sixteen receiving elements in the array with unity spacing see FIG. 2. Assume also that the center frequency to be considered has a wavelength equal to precisely twice the array spacing. Therefore, the spatial frequency of the center of the band to be considered is equal to $\pi$ radians.

For a signal at the center spatial frequency, the half power width of the beam in direction cosine space is approximately $\frac{1}{16}$ $$\left(\frac{1}{2}\frac{\lambda}{L} = \frac{1}{16} \approx 3.58°,\right.$$

where L=16 is the length of the array and $\lambda$=2 as twice the array spacing) The maximum width of the beam at a given steering angle $\theta_{look}$ is given by $$\frac{1}{\cos\theta_{look}}\frac{\lambda}{2L},$$

which can be derived as follows:

$$\sin\theta_{look} - \frac{c\pi}{\omega L} < \sin\theta < \sin\theta_{look} + \frac{c\pi}{\omega L} - \frac{c\pi}{\omega L} <$$
$$\sin\theta - \sin\theta_{look} < \frac{c\pi}{\omega L} - \frac{c\pi}{\omega L} < \sin(\theta_{look} + \delta\theta) - \sin\theta_{look} < \frac{c\pi}{\omega L}$$
$$\sin(\theta_{look} + \delta\theta) \approx \sin\theta_{look} + \cos\theta_{look}\delta\theta - \frac{c\pi}{\omega L} < \cos\theta_{look}\delta\theta < \frac{c\pi}{\omega L} < \frac{c\pi}{\omega L}$$
$$\delta\theta < \frac{1}{\cos\theta_{look}}\frac{c\pi}{\omega L}$$
$$\frac{c}{\omega} = \frac{c}{2\pi f} = \frac{\lambda}{2\pi}$$
$$\delta\theta < \frac{1}{\cos\theta_{look}}\frac{\lambda}{2L}$$

For example, at a steering angle of 60 degrees (i.e., direction cosine of about 0.86), this translates to $\delta\theta$ less than about 7.2 degrees, that is, the beam width is about 7.2 degrees.

The maximum deviation of the beam $\partial\theta_{look}$ due to frequency can be computed as follows:

$$\sin\theta_{look} = \frac{\theta_s c}{\omega L}$$
$$\partial\sin\theta_{look} = -\frac{\theta_s c}{L}\frac{1}{\omega^2}\partial\omega$$
$$= -\frac{\theta_s c}{L}\frac{1}{\omega}\frac{\partial\omega}{\omega}$$
$$= -\sin\theta_{look}\frac{\partial\omega}{\omega}$$
$$\partial\sin\theta_{look} = \cos\theta_{look}\partial\theta_{look}$$
$$\partial\theta_{look} = -\tan\theta_{look}\frac{\partial\omega}{\omega}$$

For example, if the bandwidth to be collected is equal to 20 percent of the center frequency $$\left(\frac{\partial\omega}{\omega} = 0.2\right),$$

then, at a steering angle of 60 degrees ($\theta_{look}$=60°), the maximum deviation of the beam $\partial\theta_{look}$ due to frequency variation will be about 19.8 degrees. Therefore, under these example conditions, the deviation of the beam across the frequency is comparable to or larger than the width of the beam (about 7.2 degrees to one side).

FIG. 3A illustrates a beam pattern of a low frequency of a waveform (red lobe 302) and a beam pattern of a high frequency of the waveform (blue lobe 304). This illustration assumes that phase steering is used and that the phase steering is defined to place the waveform center frequency at the desired direction. Since the beam pointing angle is dependent on frequency for a phase steered antenna, the higher frequencies will be directed closer to boresight and the lower frequencies will be directed away from boresight. FIGS. 3B and 3C are graphs illustrating beam power or amplitude (shown in color) of the sum and difference channels, respectively, as a function of spatial frequency along the horizontal axis and target direction (or angle) along the vertical axis. For a single frequency, the antenna patterns change in a consistent way as a function of angle. As can be seen from FIGS. 3B and 3C, for a given target direction, the beam power changes across the frequency spectrum (that is, the beam power is not substantially constant for a given target direction across the frequency range). In other words, the angle of arrival and the frequency are dependent on one another, thereby making it difficult to determine the target direction when using a wide band signal.

Figure 4B:
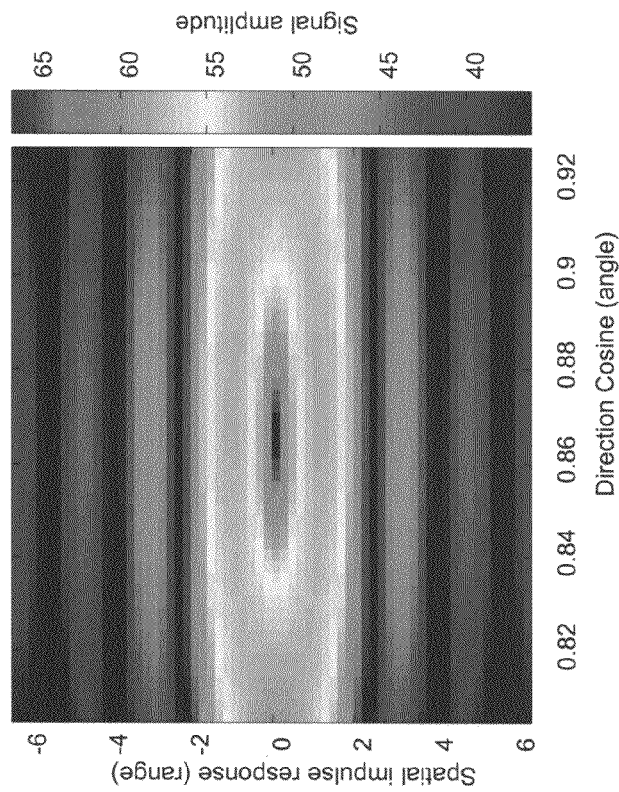
FIGS. 4A and 4B are graphs illustrating impulse responses of an unstabilized wideband signal for a sum channel and a difference channel, respectively according to a set of example conditions.
Figure 4A:
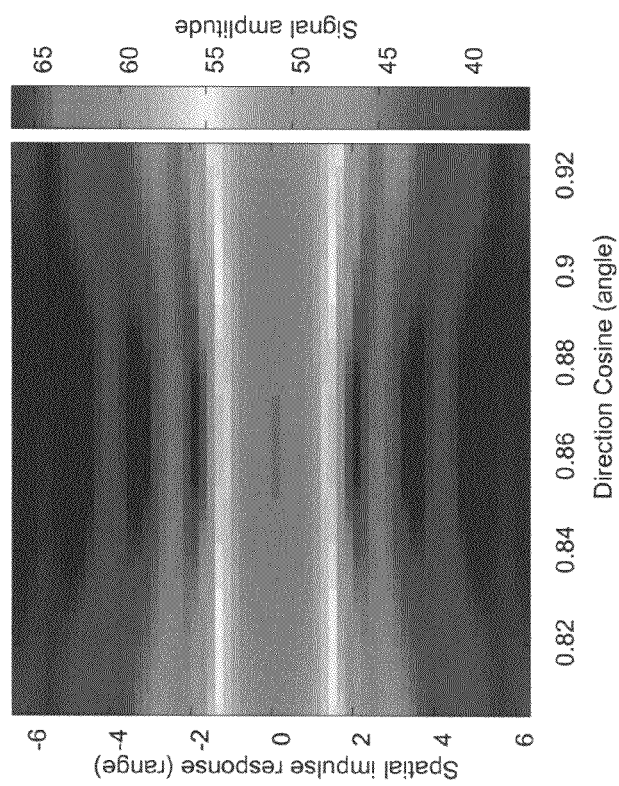

FIGS. 4A and 4B depict the impulse response of the sum and difference channels, respectively, over a range of direction cosines (or target angles). These impulse responses are formed by taking the Fourier transform of the spatial frequency signals in FIGS. 3B and 3C. Since the spatial frequency and angle of arrival are dependent on one another, it follows that the impulse response will also be dependent on the angle of arrival. This means that targets at different angles will have different impulse responses. If we imagine the case in which there are multiple targets separated in both range and angle, it is apparent that the sum and difference channels are quite different from one another and that it may be difficult, if not impossible to isolate a single target in both channels simultaneously, especially in the case of many competing signals.

For example, as can be seen in the impulse response of the sum channel in FIG. 4A, the shape of the impulse response signal varies over the direction cosine (or angle) along the x-axis. As a result, it may be difficult to map a particular received signal with a target direction. As another example, as can be seen in the impulse response of the difference channel in FIG. 4B, there is a low value (or hole) at a range of 0 and the steering angle (in this example, at about 0.866), but the shape of the impulse is not constant or similar along the range axis. To summarize, the angle-frequency relationship creates an angle dependent impulse response shape, so if the actual range to the target is unknown, or if there are multiple targets, there is no clear way to form a monopulse discriminant.

However, it is possible to combine the sum and difference channels in such a way that the impulse responses have the same shape for both the effective sum and difference channels. That is, it is possible to generate sum channels such that the impulse responses are substantially constant across the angles to the targets and to generate difference channels. In addition, this also means that it is possible for the monopulse discriminant to be used for accurate calculation of a target direction.

Embodiments of the present invention are directed toward methods and systems for accurately estimating the angle of arrival of a wide band signal. The methods and systems use signal processing to synthesize the sum and difference channels to provide a single mapping between angle and relative amplitude for all frequencies by creating a linear combination of the original channels and using combination coefficients that depend on frequency.

According to one embodiment of the present invention, conditions are imposed on the monopulse discriminant so that it is independent of frequency (for the sake of convenience, referred to hereafter as a "monopulse discriminant"). Those conditions are:

1. The monopulse discriminant is zero in the look direction for all frequencies.
2. The slope of the monopulse discriminant is frequency independent.
3. The value of the sum channel is normalized to the center frequency.
4. The value of the derivative of the difference channel is normalized to the center frequency.

In addition, the following assumptions will be made in the method:

1. The far field antenna patterns can be represented or approximated by a sum of discrete radiating elements. For a point in space defined by (x, y, z), the complex signal amplitude s given by:

$$s(x, y, z, k) \approx \sum_n w_n \exp\left[i\left(\frac{x}{R}d_{xn} + \frac{y}{R}d_{yn}\right)k - \phi_{sn}\right]$$

where $$k = \frac{\omega}{c}$$

is the spatial frequency, $d_{x,yn}$ are the antenna element locations, w is the element amplitudes (or weights), $R=\sqrt{x^2+y^2+z^2}$ is the range, and $\phi_{sn}$ is the steering phase. Note we have assumed a planar antenna located at z=0, which simplifies the calculation, but this assumption is not required for the method.

2. The steering phase corresponds to a particular direction and center frequency so:

$$\phi_{sn} = \left(\frac{x_o}{R}d_{xn} + \frac{y_o}{R}d_{yn}\right)k_o$$

where $$\frac{x_o}{R} \text{ and } \frac{y_o}{R}$$

are the pointing direction cosines, and $$k_o = \frac{\omega}{c}$$

is we nominal spatial frequency corresponding to the radio frequency carrier.

3. The monopulse discriminant can be represented as a ratio of effective antenna channels that are formed from a frequency dependent linear combination of the basic sum and difference channels.

The equations that define the combination depend on frequency $$k = \frac{\omega}{c}.$$

The first condition that the discriminant be zero can be written: $s_{\Delta x}(x_o,y_o,z_o,k)=0$, where $s_{\Delta x}$ is the stabilized difference channel in the x direction. Expressing the unstabilized channels in terms of aperture weights:

$$s'_{\Delta x}(x_o, y_o, z_o, k) = \sum_n w_{\Delta xn} \exp\left[i\left(\frac{x_o}{R}d_{xn} + \frac{y_o}{R}d_{yn}\right)(k-k_o)\right]$$

$$s'_{\Sigma x}(x_o, y_o, z_o, k) = \sum_n w_{\Sigma xn} \exp\left[i\left(\frac{x_o}{R}d_{xn} + \frac{y_o}{R}d_{yn}\right)(k-k_o)\right]$$

where $s'_{\Delta x}$ is the unstabilized difference channel and $s'_{\Sigma x}$ is the unstabilized sum channel.

A set of coefficients $m_{\Delta\Delta x}(k)$, $m_{\Delta\Sigma x}(k)$ can be used to satisfy the condition on $s_{\Delta x}$, where these coefficients satisfy:

$$m_{\Delta\Delta x}s'_{\Delta x}(x_o,y_o,z_o,k)+m_{\Delta\Sigma x}s'_{\Sigma x}(x_o,y_o,z_o,k)=s_{\Delta x}(x_o,y_o,z_o,k)=0$$

this implies that:

$$\frac{m_{\Delta\Sigma x}}{m_{\Delta\Delta x}} = -\frac{\sum_n w_{\Delta xn} \exp\left[i\left(\frac{x_o}{R}d_{xn} + \frac{y_o}{R}d_{yn}\right)(k-k_o)\right]}{\sum_n w_{\Sigma xn} \exp\left[i\left(\frac{x_o}{R}d_{xn} + \frac{y_o}{R}d_{yn}\right)(k-k_o)\right]} \quad (1)$$

The second condition that the slope of the monopulse discriminant be independent of frequency can be written:

$$\frac{\frac{\partial s_{\Delta x}}{\partial x}(x_o, y_o, z_o, k)}{s_{\Sigma x}(x_o, y_o, z_o, k)} - \frac{s_{\Delta x}(x_o, y_o, z_o, k)}{[s_{\Sigma x}(x_o, y_o, z_o, k)]^2}\frac{\partial s_{\Sigma x}}{\partial x}(x_o, y_o, z_o, k) = K_m$$

where $K_m$ is the slope of the discriminant at the carrier frequency, $k_o$, $$K_m = \frac{\frac{\partial s_{\Delta x}}{\partial x}(x_o, y_o, z_o, k_o)}{s_{\Sigma x}(x_o, y_o, z_o, k_o)} - \frac{s_{\Delta x}(x_o, y_o, z_o, k_o)}{[s_{\Sigma x}(x_o, y_o, z_o, k_o)]^2}\frac{\partial s_{\Sigma x}}{\partial x}(x_o, y_o, z_o, k_o)$$

Recalling now that the first condition is $s_{\Delta x}(x_o,y_o,z_o,k)=0$, the two above expressions can be simplified such that:

$$\frac{\frac{\partial s_{\Delta x}}{\partial x}(x_o, y_o, z_o, k)}{s_{\Sigma x}(x_o, y_o, z_o, k)} = K_m$$

and similarly, $$K_m = \frac{\frac{\partial s_{\Delta x}}{\partial x}(x_o, y_o, z_o, k_o)}{s_{\Sigma_x}(x_o, y_o, z_o, k_o)} \quad (5)$$

To satisfy the above constraint that Km be constant as a function of frequency is the constraint we add an additional set of coefficients $m_{\Sigma\Delta x}(k)$, $m_{\Sigma\Sigma x}(k)$ that can be used to form the stabilized sum channel. These coefficients satisfy:

$$m_{\Sigma\Delta x}s'_{\Delta x}(x_o,y_o,z_o,k) + m_{\Sigma\Sigma x}s'_{\Sigma x}(x_o,y_o,z_o,k) = s_{\Sigma x}(x_o,y_o,z_o,k)$$

The derivatives of the unstabilized patterns can be expressed in terms of the aperture weights:

$$\frac{\partial s'_{\Sigma x}}{\partial x}(x_o, y_o, z_o, k) = \sum_n w_{\Sigma xn}\frac{d_{xn}k}{R}\exp\left[i\left(\frac{x_o}{R}d_{xn} + \frac{y_o}{R}d_{yn}\right)(k-k_o)\right]$$

and $$\frac{\partial s'_{\Delta x}}{\partial x}(x_o, y_o, z_o, k) = \sum_n w_{\Delta xn}\frac{d_{xn}k}{R}\exp\left[i\left(\frac{x_o}{R}d_{xn} + \frac{y_o}{R}d_{yn}\right)(k-k_o)\right]$$

This provides a condition on the additional coefficients that can be expressed as a sum over aperture weights:

$$\frac{m_{\Delta\Delta}\partial s'_\Delta + m_{\Delta\Sigma}\partial s'_\Sigma}{m_{\Sigma\Delta}s'_\Delta + m_{\Sigma\Sigma}s'_\Sigma} = K_m \quad (2)$$

where, to simplify notation, $s'_\Sigma$ defined as:

$$s'_\Sigma = s'_{\Sigma x}(x_o, y_o, z_o, k) = \sum_n w_{\Sigma xn}\exp\left[i\left(\frac{x_o}{R}d_{xn} + \frac{y_o}{R}d_{yn}\right)(k-k_o)\right]$$

and $$\partial s'_\Sigma = \frac{\partial s'_{\Sigma x}}{\partial x}(x_o, y_o, z_o, k) = \sum_n w_{\Sigma xn}\frac{d_{xn}k}{R}\exp\left[i\left(\frac{x_o}{R}d_{xn} + \frac{y_o}{R}d_{yn}\right)(k-k_o)\right]$$

with similar definitions for the difference channel and its derivative.

So far, four coefficients have been defined above, but only two equations (1) and (2) link them. The equations for the coefficients can be closed by considering the normalization conditions:

$$m_{\Sigma\Delta}s'_\Delta + m_{\Sigma\Sigma}s'_\Sigma = S \quad (3)$$

and $$m_{\Delta\Delta}\partial s'_\Delta + m_{\Delta\Sigma}\partial s'_\Sigma = D \quad (4)$$

where $$S = s'_{\Sigma x}(x_o, y_o, z_o, k_o)$$

and $$D = \frac{\partial s'_{\Delta x}}{\partial x}(x_o, y_o, z_o, k_o)$$

Note that the normalization conditions make the monopulse discriminant condition redundant. This means that an additional condition is needed to solve for the coefficients. This additional condition is that the peak of the sum channel is invariant with respect to spatial frequency. This can be expressed as:

$$m_{\Sigma\Delta}\partial s'_\Delta + m_{\Sigma\Sigma}\partial s'_\Sigma = 0 \quad (5)$$

Solving these equations provides the following expressions for the coefficients:

$$m_{\Delta\Sigma} = \frac{-\partial s'_\Delta D}{s'_\Sigma \partial s'_\Delta - s'_\Delta \partial s'_\Sigma} \quad (6)$$

$$m_{\Delta\Delta} = \frac{D - m_{\Delta\Sigma}\partial s'_\Sigma}{\partial s'_\Delta} \quad (7)$$

$$m_{\Sigma\Delta} = \frac{-\partial s'_\Sigma S}{s'_\Sigma \partial s'_\Delta - s'_\Delta \partial s'_\Sigma} \quad (8)$$

$$m_{\Sigma\Sigma} = \frac{S - m_{\Sigma\Delta}s'_\Delta}{s'_\Sigma} \quad (9)$$

According to one embodiment of the present invention, the above computed coefficients would then be applied to the unstabilized difference and sum channels to generate stabilized difference and sum channels. For example, the stabilized difference and sum channels would be expressed as $s_\Delta = m_{\Delta\Delta}s'_\Delta + m_{\Delta\Sigma}s'_\Sigma$ and $s_\Sigma = m_{\Sigma\Delta}s'_\Delta + m_{\Sigma\Sigma}s'_\Sigma$, respectively. A method for performing this stabilization is described in further detail below.

Figure 5A:
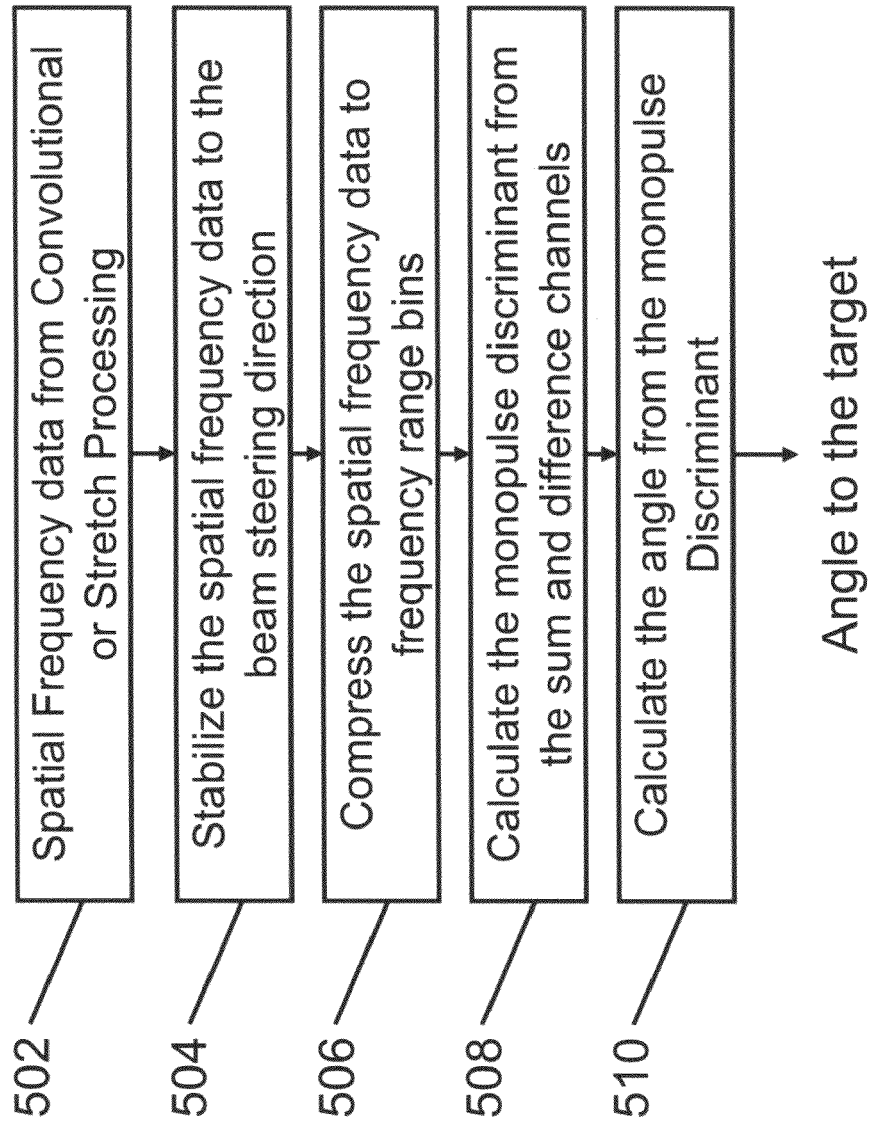
FIG. 5A is a flowchart illustrating a method of determining an angle to a target from unstabilized spatial frequency data according to one embodiment of the present invention.
Figure 5B:
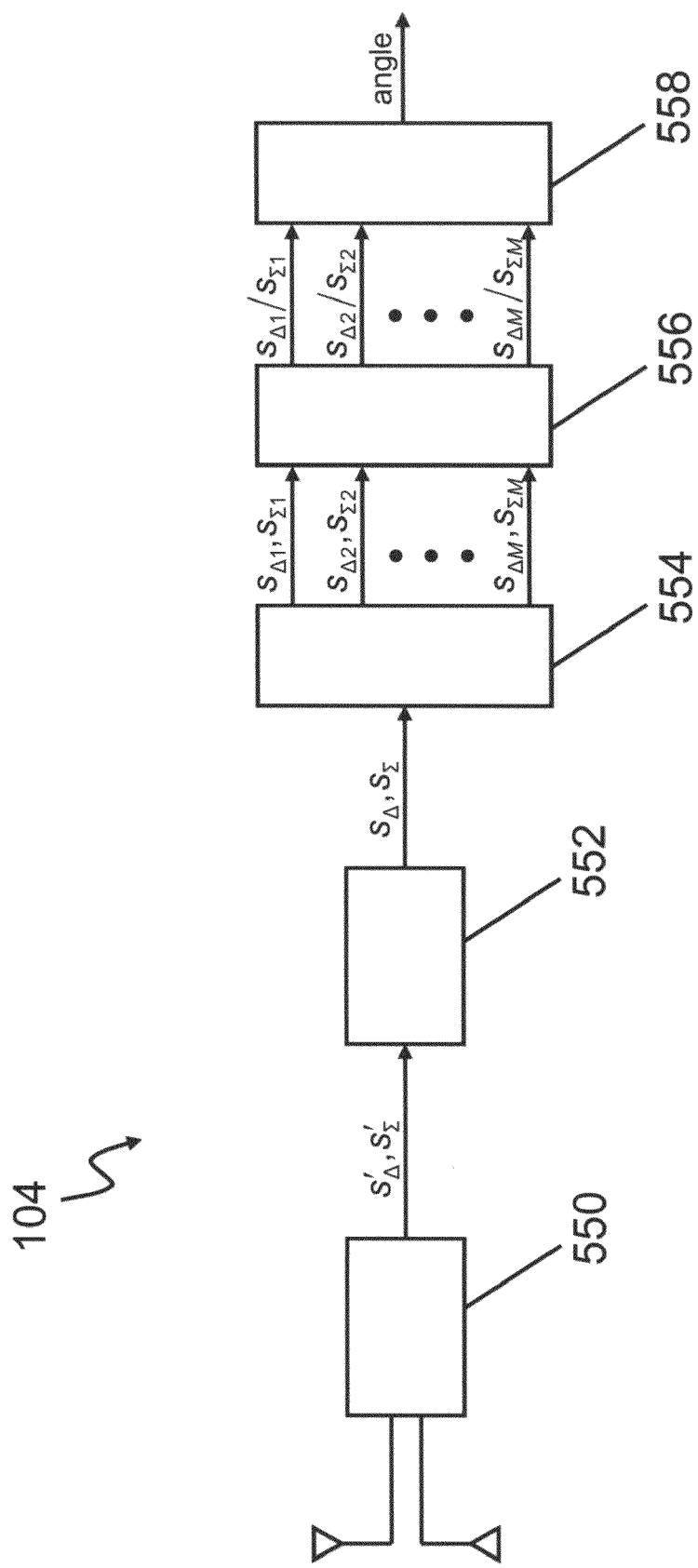
FIG. 5B is a block diagram illustrating a signal processor for determining a target angle from spatial frequency data according to one embodiment of the present invention.

FIG. 5A is a flowchart illustrating a method of determining an angle to a target from unstabilized spatial frequency data which is formed after initial range processing from the raw data received from an antenna according to one embodiment of the present invention. FIG. 5B is a block diagram illustrating a signal processor 104 for determining the target angle from the spatial frequency data according to one embodiment of the present invention. The signal received from the antenna undergoes transformation to spatial frequency data (e.g., through the first stage of convolutional or stretch processing) (502) at a spatial frequency processor (550). The spatial frequency data (e.g., $s'_\Delta$ and $s'_\Sigma$) is then stabilized (504) at a signal stabilizer 552. The stabilized frequency data (e.g., $s_\Delta$ and $s_\Sigma$) is then compressed into a plurality of frequency range bins (506) using a frequency to range transformer 554 (which may configured to perform, for example, an inverse fast Fourier transform), where each element of the outputs is a range bin. The monopulse discriminant can then be calculated from the stabilized sum and difference channels (508) using a monopulse discriminant calculator 556, which outputs a monopulse discriminant for each of the range bins. The monopulse discriminant can then be used to calculate the target angle or angles to multiple targets (510) using a target angle calculator 558 which also outputs the result of the calculation.

In such an arrangement, most of the energy corresponding to a given target is in just one range bin, so the angle corresponding to the range to the target is an excellent measurement. Furthermore, when there are multiple targets in the set of range bins, the computation would produce an angle to each target.

Figure 6A:
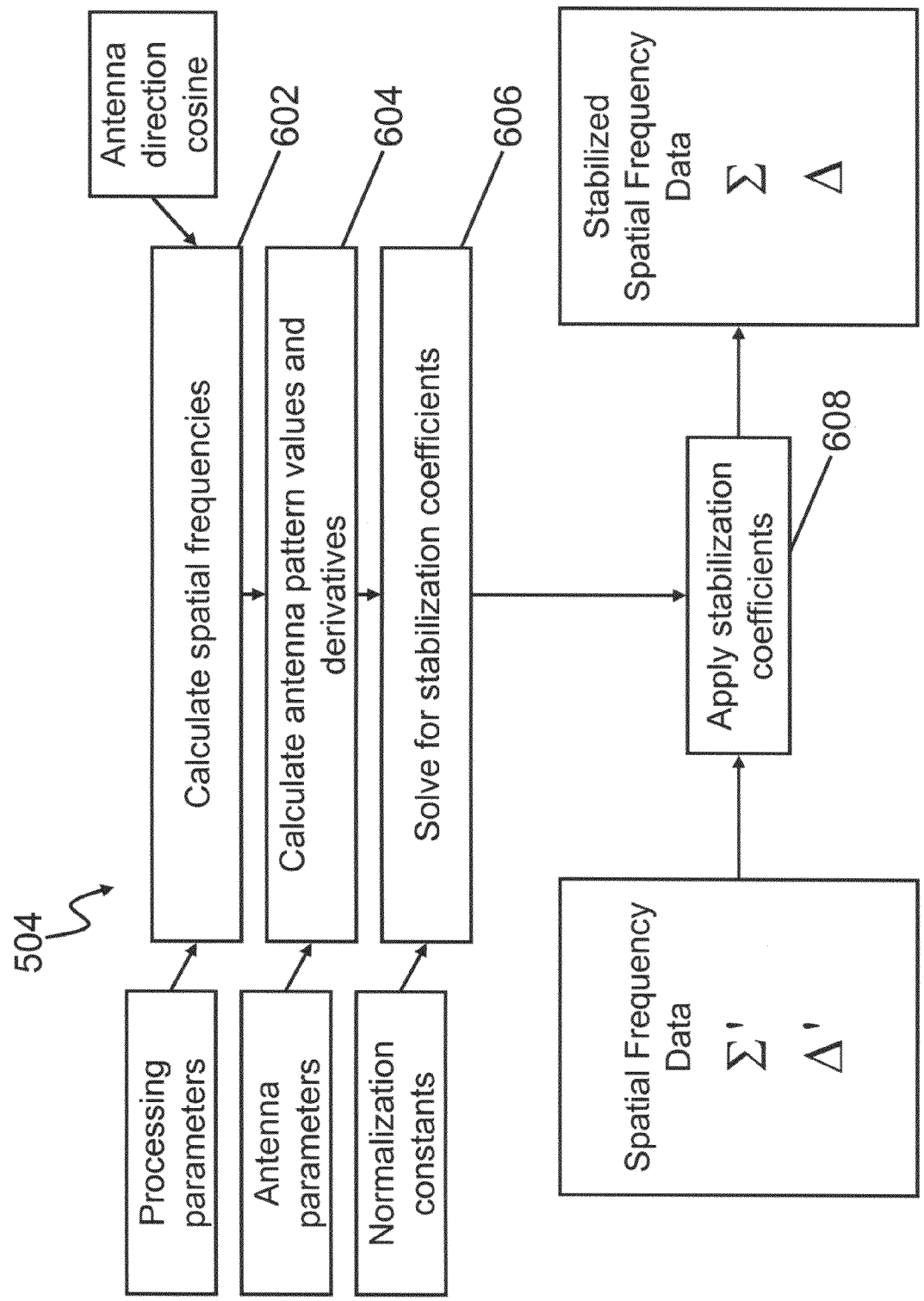
FIG. 6A is a flowchart illustrating a method of stabilizing spatial frequency data according to one embodiment of the present invention.
Figure 6B:
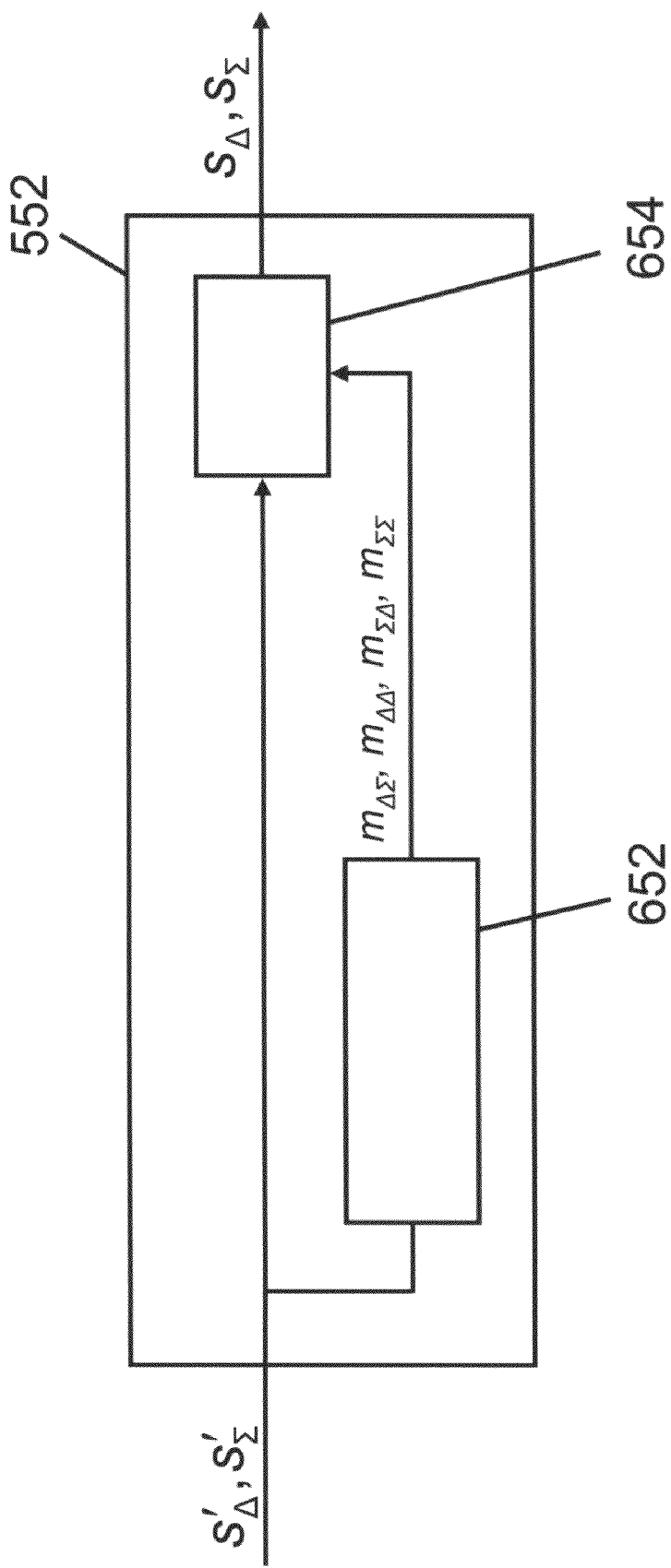
FIG. 6B is a block diagram illustrating a signal stabilizer according to one embodiment of the present invention.

FIG. 6A is a flowchart illustrating, in additional detail, a method of stabilizing the spatial frequency data to the beam steering direction according to one embodiment of the present invention. FIG. 6B is a block diagram illustrating a signal stabilizer 552 according to one embodiment of the present invention. The spatial frequencies (e.g., $s'_\Delta$ and $s'_\Sigma$)

are calculated from the spatial frequency data (602) using processing parameters of the signal waveforms (e.g., the characteristics of the transmitted pulse) and the steering direction (or antenna direction cosine). Using antenna parameters (e.g., the number and spacing of antenna elements), antenna pattern values (e.g., element amplitudes or weights of the antenna elements) and derivatives of the spatial frequencies are also calculated (604). Normalization constants are used to solve for stabilization coefficients (e.g., $m_{\Delta\Sigma}$, $m_{\Delta\Delta}$, $m_{\Sigma\Delta}$, and $m_{\Sigma\Sigma}$, as described above) (606) by a stabilization coefficient calculator 652. The stabilization coefficients (which may be expressed as a combination matrix) are applied to the spatial frequency data (e.g., $s'_\Delta$ and $s'_\Sigma$) by a combiner (or matrix multiplier) 654 to obtain stabilized spatial frequency data (e.g., $s_\Delta = m_{\Delta\Delta} s'_{66} + m_{\Delta\Sigma} s'$ and $s_\Sigma = m_{\Sigma\Delta} s'_\Delta + m_{\Sigma\Sigma} s'_\Sigma$) (608).

According to one embodiment of the present invention, the method described in FIGS. 5A and 6A may be applied using the devices depicted in FIGS. 5B and 6B to the example conditions where it was assumed that a wide band signal incident on an antenna array that was steered to 60 degrees away from boresight, the antenna array having sixteen receiving elements in the array with unity spacing. In the example conditions, it was also assumed that the center frequency to be considered had a wavelength equal to precisely half of the array spacing and therefore the spatial frequency of the center of the band to be considered was equal to it radians. FIGS. 7A, 7B, 7C, 8A, 8B, 9A, and 9B illustrate the results of the analysis.

FIG. 7A is a graph depicting the values of the four coefficients $m_{\Delta\Sigma}$, $m_{\Delta\Delta}$, $m_{\Sigma\Delta}$, and $m_{\Sigma\Sigma}$ calculated according to one embodiment of the present invention for the example conditions over a range of spatial frequencies. FIGS. 7B and 7C illustrate the signal amplitude of the stabilized sum and difference channels of the example conditions, respectively, as functions of spatial frequency in the horizontal axis and target direction cosine in the vertical axis. As can be seen, the sum and difference channels have been stabilized such that the beam strength is substantially constant across the frequency range for a given target direction.

Figures 8A, 8B:
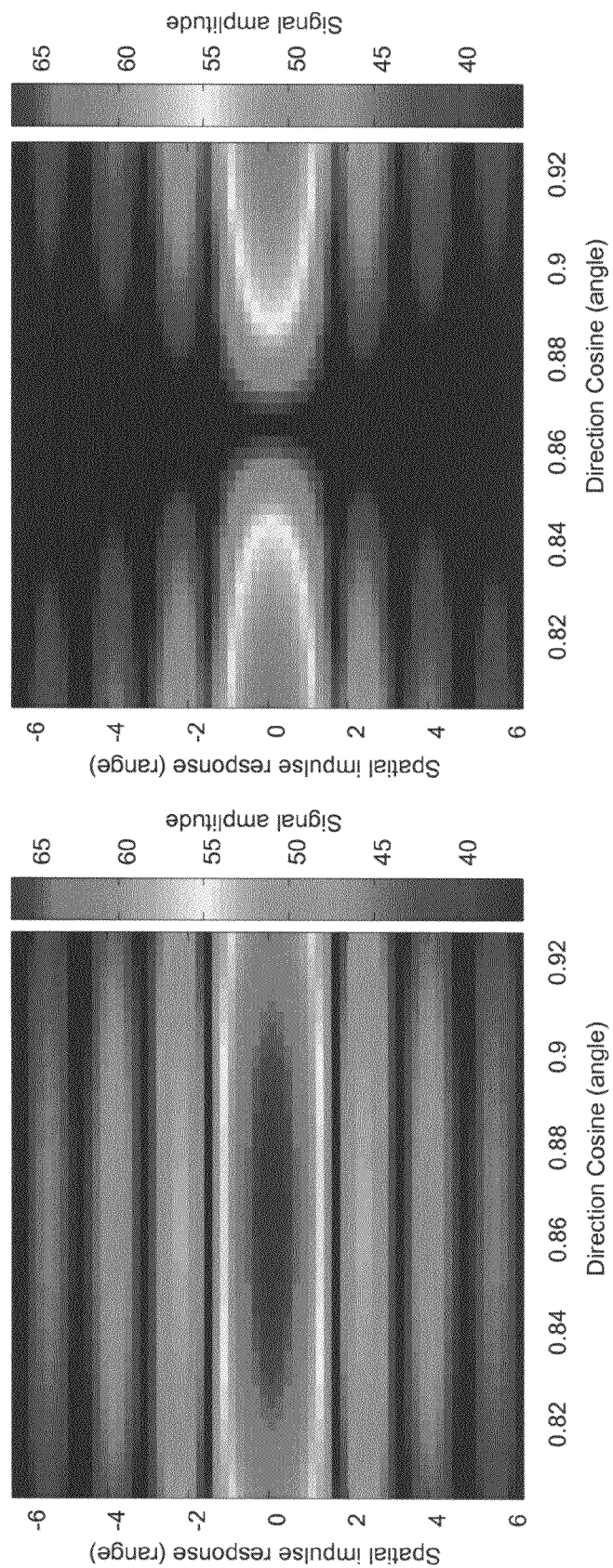
FIGS. 8A and 8B are graphs depicting the impulse response for the sum and difference channels of the example conditions, respectively, according to one embodiment of the present invention for a set of example conditions.

According to one embodiment of the present invention, a benefit of beam stabilization is realized when the spatial frequency is converted to an impulse response. FIGS. 8A and 8B are graphs depicting the values of the impulse response for the sum and difference channels of the example conditions, respectively, under the conditions of the above described example. As can be seen from FIGS. 8A and 8B, valid impulses are obtained for both the sum and difference channels. For example, in FIG. 8A the impulse response for the sum channel has substantially the same shape across the target angles and in FIG. 8B the impulse response for the difference channel has substantially the same shape for all range values at the steering angle (although the magnitude of the impulse response changes with angle). This shows that a monopulse measurement can be made directly on the impulse response, even if there is an error in target range or if multiple targets are present.

Figure 9A:
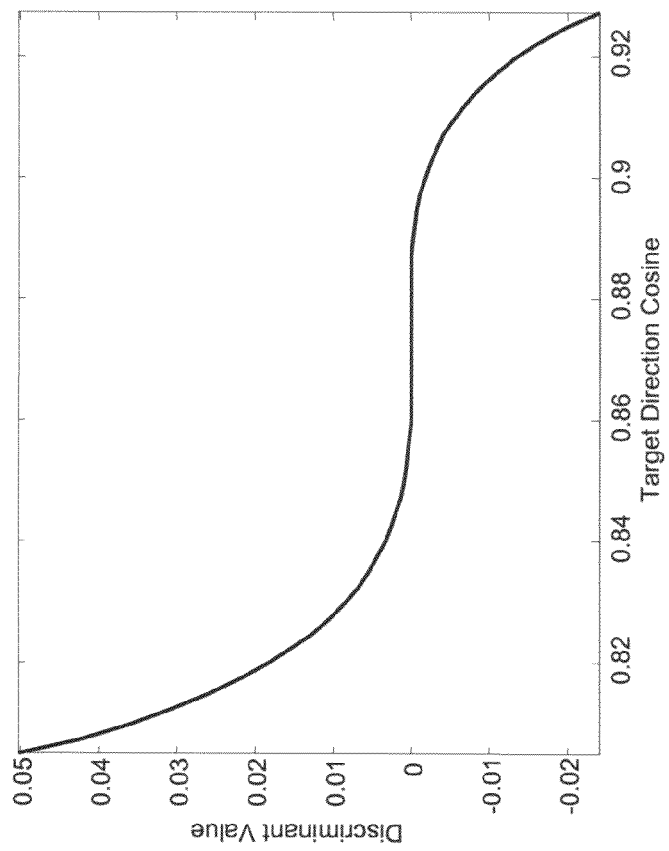
FIG. 9A is a graph comparing an ideal discriminant for a narrow band signal with a discriminant derived from the stabilized impulse response over a direction.
Figure 9B:
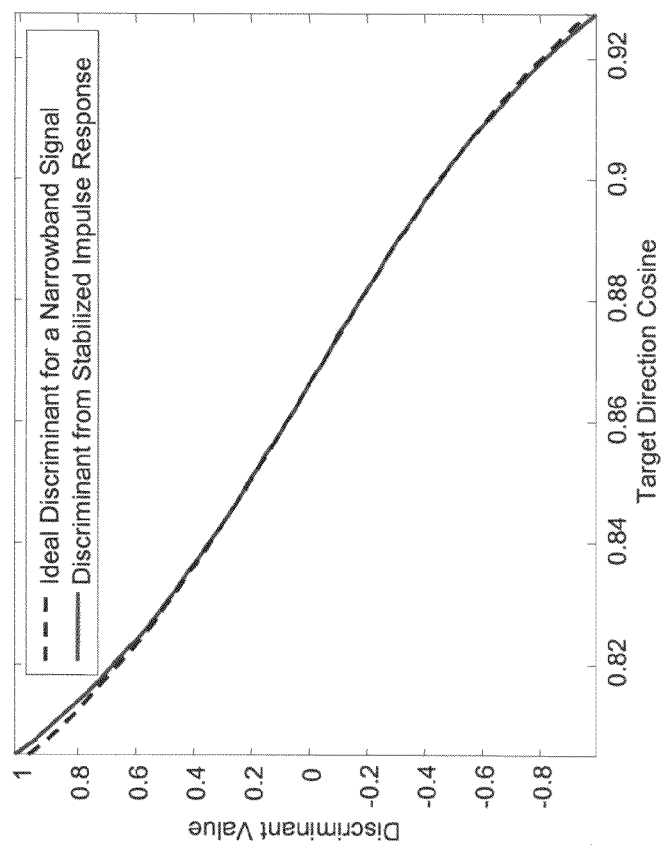
FIG. 9B is a graph of the difference between the ideal discriminant for the narrow band signal and the discriminant derived from the stabilized impulse response.

FIG. 9A is a graph comparing an ideal discriminant for a narrow band signal and a discriminant derived from the stabilized impulse response over a direction. FIG. 9B is a graph of the difference between the ideal discriminant for the narrow band signal and the discriminant derived from the stabilized impulse response. As can be seen from FIGS. 9A and 9B, the derived discriminant is very close to the ideal discriminant over a broad frequency range.

Therefore, as can be seen from the above example, embodiments of the present invention provide systems and methods by which a wide band monopulse signal is be stabilized such that it is substantially frequency independent, thereby simplifying and improving the accuracy of the calculation of a target angle from the wide band monopulse signal.

While the present invention has been described in reference to certain exemplary embodiments, it is to be understood to those skilled in the art that the invention is not limited to the disclosed embodiment, but, on the contrary, is intended to cover various modifications included within the spirit and scope of the appended claims and equivalents thereof.

For example, individual hardware components (such as those shown in the embodiments depicted in FIGS. 5B and 6B) may be implemented as specialized discrete chips (such as digital signal processors, analog or digital filters, and field programmable gate arrays), general purpose processors programmed to perform the functions of the shown components, or combinations thereof.

What is claimed is:

1. A method for estimating a target angle of a wideband signal received on an electronically steered antenna array, the method comprising:
    generating spatial frequency data from the received wideband signal;
    stabilizing the spatial frequency data to a beam steering direction;
    compressing the stabilized spatial frequency data to a plurality of frequency range bins;
    calculating a monopulse discriminant from the stabilized spatial frequency data; and
    calculating the target angle using the monopulse discriminant.

2. The method of claim 1, wherein the stabilizing the spatial frequency data to the beam steering direction comprises:
    calculating the spatial frequency data using processing parameters and antenna direction cosine;
    calculating derivatives of the spatial frequency data and antenna pattern values using antenna parameters;
    solving for a plurality of stabilization coefficients using normalization constants; and
    applying the plurality of stabilization coefficients to the spatial frequency data to generate the stabilized spatial frequency data.

3. The method of claim 1, wherein the calculating the monopulse discriminant comprises calculating a plurality of monopulse discriminants from the stabilized spatial frequency data.

4. The method of claim 3, wherein the calculating the plurality of monopulse discriminants comprises calculating an individual monopulse discriminant of the plurality of monopulse discriminants for each of the plurality of frequency range bins.

5. The method of claim 1, wherein the target angle comprises a plurality of target angles.

6. The method of claim 1, wherein the compressing the stabilized spatial frequency data comprises applying an inverse Fourier transform to the stabilized spatial frequency data.

7. A system for stabilizing wideband spatial frequency data for estimating a target angle of a wideband signal on an electronically steered antenna array, the system comprising:
    a spatial frequency processor for transforming the wideband signal to spatial frequency data;
    a signal stabilizer configured to stabilize the spatial frequency data;
    a frequency to range transformer configured to compress the stabilized spatial frequency data into a plurality of frequency range bins;

a monopulse discriminant calculator for calculating a monopulse discriminant from the compressed stabilized spatial frequency data; and a target angle calculator configured to calculate the target angle using the monopulse discriminant.

8. The system of claim 7, wherein the signal stabilizer comprises:
a stabilization coefficient calculator configured to calculate a plurality of stabilization coefficients; and
a combiner configured to combine the spatial frequency data with the plurality of stabilization coefficients to generate stabilized spatial frequency data.

9. The system of claim 8, wherein the stabilization coefficient calculator is configured to calculate derivatives of the spatial frequencies and antenna pattern values using antenna parameters and to solve for the stabilization coefficients using a plurality of normalization constants.

10. The system of claim 7, wherein the monopulse discriminant calculator is configured to calculate a plurality of monopulse discriminants.

11. The system of claim 10, wherein the monopulse discriminant calculator is configured to calculate an individual monopulse discriminant of the plurality of monopulse discriminants for each of the plurality of frequency range bins.

12. The system of claim 7, wherein the frequency to range transformer is configured to perform an inverse fast Fourier transform.

13. The system of claim 7, wherein the target angle comprises a plurality of target angles.

14. A wideband monopulse radar system comprising:
an antenna array comprising a plurality of antennas for receiving a wideband monopulse signal;
a signal processor for estimating a target angle of the wideband monopulse signal, the signal processor being configured to:
transform the wideband monopulse signal to wideband spatial frequency data;
stabilize spatial frequency data of the wideband monopulse signal to a beam steering direction;
compress the stabilized spatial frequency data to a plurality of frequency range bins;
calculate a monopulse discriminant from the compressed stabilized spatial frequency data; and
calculate the target angle using the monopulse discriminant.

15. The wideband monopulse radar system of claim 14, wherein, to stabilize the spatial frequency data to the beam steering direction, the signal processor is configured to:
calculate spatial frequencies using processing parameters and antenna direction cosine;
calculate antenna pattern values and derivatives using antenna parameters;
solve for a stabilization coefficients using normalization constants; and
apply the stabilization coefficients to the spatial frequency data to generate the stabilized spatial frequency data.

16. The wideband monopulse radar system of claim 14, wherein the monopulse discriminant comprises a plurality of monopulse discriminants and the signal processor is configured to calculate the plurality of monopulse discriminants from the stabilized spatial frequency data.

17. The wideband monopulse radar system of claim 16, wherein the signal processor is configured to calculate an individual monopulse discriminant of the plurality of monopulse discriminants for each of the plurality of frequency range bins.

18. The wideband monopulse radar system of claim 14, wherein the target angle comprises a plurality of target angles.

19. The wideband monopulse radar system of claim 14, wherein the signal processor is configured to compress the spatial frequency data by applying an inverse Fourier transform to the wideband spatial frequency data.

* * * * *